Feb. 18, 1958  E. B. MILLER  2,823,764
CYCLIC ADSORPTION PROCESSES FOR REMOVAL AND/OR RECOVERY
OF CONDENSABLE HYDROCARBONS FROM NATURAL GAS
Filed Feb. 8, 1957  6 Sheets-Sheet 1

INVENTOR.
ERNEST B. MILLER
BY Adams + Bush
ATTORNEY

Feb. 18, 1958 E. B. MILLER 2,823,764
CYCLIC ADSORPTION PROCESSES FOR REMOVAL AND/OR RECOVERY
OF CONDENSABLE HYDROCARBONS FROM NATURAL GAS
Filed Feb. 8, 1957 6 Sheets-Sheet 2

INVENTOR
ERNEST B. MILLER
BY Adams + Bush
ATTORNEYS

Feb. 18, 1958 E. B. MILLER 2,823,764
CYCLIC ADSORPTION PROCESSES FOR REMOVAL AND/OR RECOVERY
OF CONDENSABLE HYDROCARBONS FROM NATURAL GAS
Filed Feb. 8, 1957 6 Sheets-Sheet 3

INVENTOR
ERNEST B. MILLER

BY Adams + Bush
ATTORNEYS

Feb. 18, 1958            E. B. MILLER            2,823,764
CYCLIC ADSORPTION PROCESSES FOR REMOVAL AND/OR RECOVERY
OF CONDENSABLE HYDROCARBONS FROM NATURAL GAS
Filed Feb. 8, 1957                        6 Sheets-Sheet 4

INVENTOR
ERNEST B. MILLER

BY *Adams + Bush*

ATTORNEYS

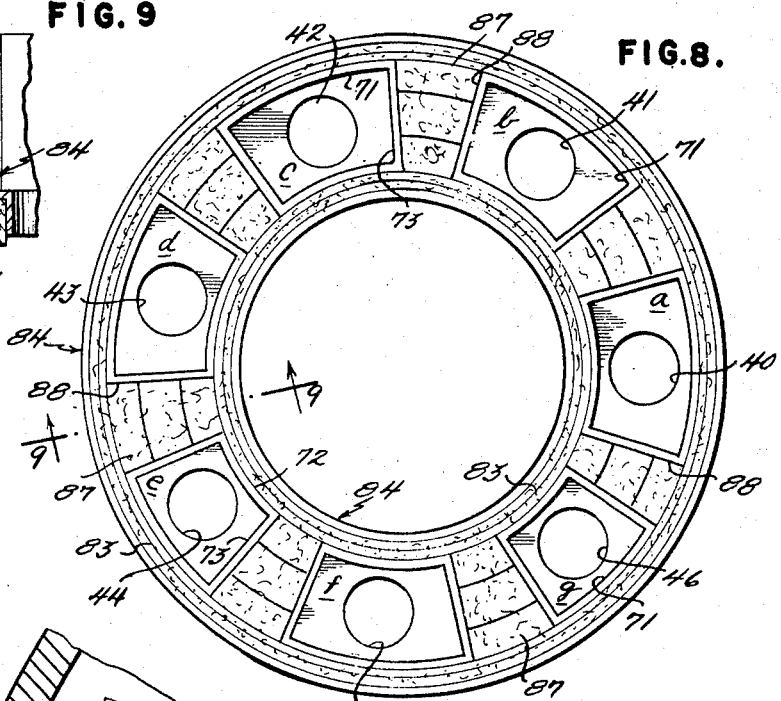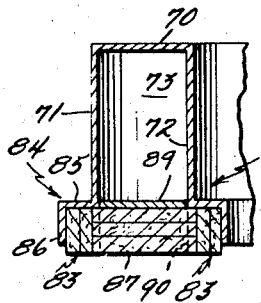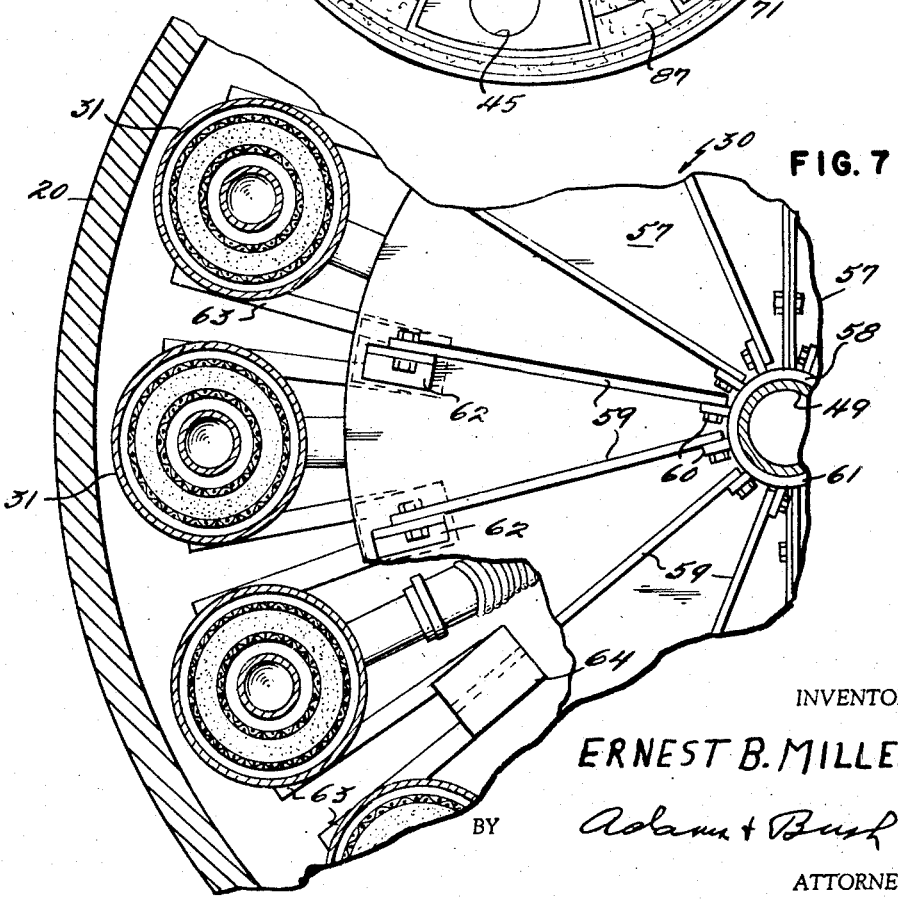

INVENTOR
ERNEST B. MILLER
BY
ATTORNEYS

United States Patent Office 2,823,764
Patented Feb. 18, 1958

2,823,764

CYCLIC ADSORPTION PROCESSES FOR REMOVAL AND/OR RECOVERY OF CONDENSABLE HYDROCARBONS FROM NATURAL GAS

Ernest B. Miller, Houston, Tex., assignor to Jefferson Lake Sulphur Company, New Orleans, La., a corporation of New Jersey Application February 8, 1957, Serial No. 639,006

4 Claims. (Cl. 183—114.2)

This invention relates to gas dehydrating and has more particular reference to a continuous process for removing moisture and condensable hydrocarbons from wet natural gas at the source, prior to the transmission thereof through pipe lines, and recovering the condensable hydrocarbons.

One object of the present invention is to provide a novel and improved cyclic adsorption process for dehydrating wet natural gas of the type comprising an adsorption cycle in which the natural gas being treated passes through one or more adsorption stages of the adsorber; and an activation cycle employing a captive activation gas recycled through a heater, the activation stage of the adsorber, and a condenser separator.

Another object of the present invention is to provide a novel and improved cyclic adsorption process for the removal and/or recovery of water vapor and condensable hydrocarbons from wet natural gas, as characterized above, including two activation cycles to effect a more complete activation and a more complete removal of the products to be recovered, and three purging cycles, a first purging cycle preceding the first activation cycle, a second purging cycle intermediate the two activation cycles, and a third purging cycle following the second activation cycle to prevent dilution of the activation gases by slippage gas and also prevent the loss of desorbed products by slippage of the activation gas into the outgoing effluent stripped natural gas, and a condenser separator through which the recycling captive activation gas used in the first activation cycle passes, to remove the water vapor and condensable hydrocarbons therefrom.

A further object of the present invention is to provide a novel and improved cyclic adsorption process for the removal and/or recovery of water vapor and condensable hydrocarbons from wet natural gas, as characterized above, wherein the captive activation gas employed in the second activation stage has a lower hydrocarbon content and is heated to a higher temperature than the captive activation gas employed in the first activation stage so as to effect a very complete removal of the desired hydrocarbons.

Other objects and advantages of the invention will appear in the following specification when considered in connection with the accompanying drawings, in which:

Fig. 7 is a fragmentary sectional view taken on the line 7—7 of Fig. 4, showing the manner of supporting the lower ends of the elongated adsorbent material containing vessels;

Fig. 8 is a horizontal sectional view taken on the line 8—8 of Fig. 4;

Fig. 9 is a detail sectional view, taken on the line 9—9 of Fig. 8;

Figure 1:
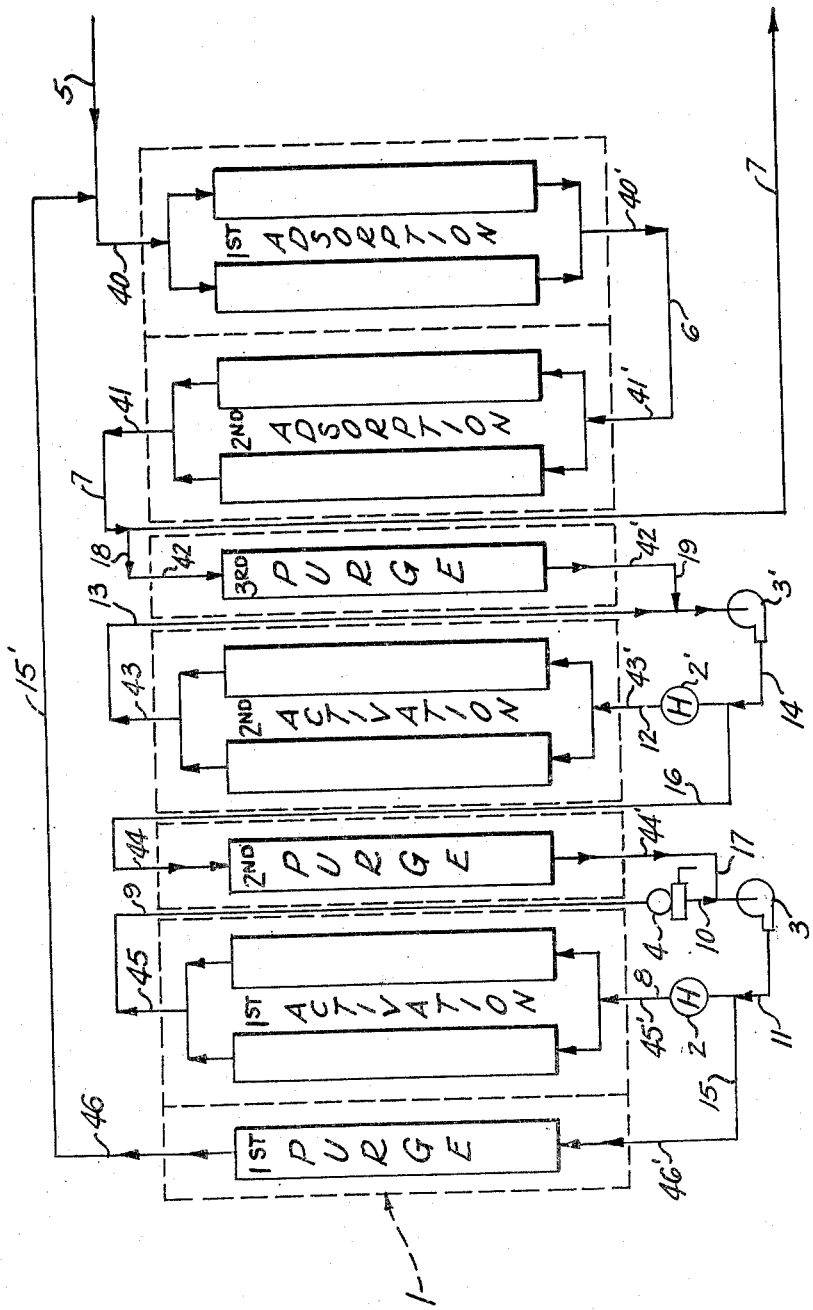
Fig. 1 is a schematic view showing one embodiment of apparatus and the arrangement thereof for carrying out the method of the present invention and the flow of the various fluids therethrough.

The present invention is drawn to a novel method of dehydrating wet natural gas under high pressure and removing the condensable hydrocarbons therefrom, and is an improvement over the method disclosed and claimed in my co-pending application Ser. No. 623,862, filed November 23, 1956, for Cyclic Adsorption Process.

The present invention provides a novel and improved process for removing and/or recovering water vapor and condensable hydrocarbons from wet natural gas. The process is a continuous cyclic adsorption process employing an adsorber in which at least one bed of adsorbed material is maintained in a plurality of stages and, in general, comprises an adsorption cycle in which a continuous flow of the natural gas being treated is directed, under high pressure, through one or more adsorption stages so that the contained water vapor and condensable hydrocarbons will be adsorbed by the beds of adsorption material therein; a first activation cycle in which a flow of a captive activation medium, under high pressure, is continuously recirculated through a heater and a first activation stage to vaporize the moisture and condensable hydrocarbons contained in the adsorbent material therein and reactivate the adsorbent material; a second activation cycle in which a flow of a captive activation medium, under high pressure, is continuously recirculated through a heater and a second activation stage to vaporize the moisture and condensable hydrocarbons contained in the adsorbent material therein and reactivate the adsorbent material; a first purging cycle in which a portion of the recycling activation medium used in the first activation cycle is continuously diverted and passed into a stage immediately preceding the first activation stage, called the first purging stage, with the effluent gas from the first purging stage passing into the flow of the gas being treated on its way to the first adsorption stage; a second purging cycle in which a portion of the recycling activation medium used in the second activation cycle is continuously diverted and passed into a stage, intermediate the first activation stage and the second activation stage, called the second purging stage, with the effluent gas from the second purging stage passing into the flow of the captive activation medium being recycled through the first activation stage; a third purging cycle in which a portion of the effluent stripped gas being treated from the last adsorption stage is continuously diverted and passed into a stage immediately following the second activation stage, called the third purging stage, with the effluent gas from the third purging stage passing into the flow of the captive activation medium being recycled through the second activation stage; the periodical shifting of the relative positions of the particular adsorbent material and the particular flow of fluid through each stage, either by moving the beds of adsorbent material through the stages or by shifting the flows of fluid through the several stages, so that each stage becomes, in succession, a first purging stage, a first activation stage, a second purging stage, a second activation stage, a third purging stage, and an adsorption stage; and a product recovery cycle in which the flow of the recycling activation medium used in the first activation stage, after its passage through the first activation stage, passes through a condensing and separating zone where the water vapor and condensable hydrocarbons are condensed and recovered with the stripped activation gas from the condensing and separating zone passing back into its recycling path.

While any suitable usual type of adsorption apparatus may be employed to practice the process of the present invention, for purpose of illustration, the process will be described as carried out by employing a rotary type of adsorber in which a plurality of elongated upright closed vessels containing adsorbent material are rotated directly in succession and substantially continuously through the various stages of the adsorber.

Referring now to the drawings, there is shown, in Fig. 1, one embodiment of apparatus and arrangement thereof for carrying out the process of the present invention. The apparatus shown includes a seven stage rotary adsorber 1, two stages of which are employed as adsorption stages, two stages of which are employed as activation stages, and three stages of which are employed as purging stages; a pair of heaters 2, 2' for heating the activation gas used in the two activation stages; a pair of fans or blowers 3, 3' for recirculating the activation gases through the activation stages; and a condenser-separator 4 employed to condense the moisture and condensable hydrocarbons contained in the recirculating activation gas in the first activation stage after the gas has passed through the first activation stage of the adsorber.

The wet gas being treated is delivered, at high pressure, from the ususal compressor or source of supply (not shown) to the first adsorption stage of the adsorber by means of a pipe line 5. The gas passes through the first adsorption stage, where some of the moisture and condensable hydrocarbons are removed. From the first adsorption stage of the adsorber, the gas passes through pipe line 6 to the second adsorption stage of the adsorber. An intercooler may be employed to cool the gas before it passes into the second adsorption stage of the adsorber, if desirable. After passing through the second adsorption stage, the moisture and condensable hydrocarbon stripped gas passes through pipe line 7 to its various points of use.

The captive activation gas for the first activation stage is heated in the heater 2 to a temperature of about 400° F., and from the heater, passes through a pipe line 8 to the first activation stage of the adsorber. The heated gas passes upwardly through the first activation stage, desorbing the accumulated moisture and hydrocarbons from the adsorbent material therein. The heated gas and the moisture vapor and condensable hydrocarbons desorbed from the adsorbent material pass through a pipe line 9 to the condenser-separator 4, where the moisture vapor and condensable hydrocarbons are condensed and separated. The water and hydrocarbons are drained from the bottom of the separator by means of a suitable drain pipe. From the condenser-separator 4, the now stripped activation gas passes through a pipe line 10 to the blower or fan 3 and is recirculated by the blower through a pipe line 11 and the heater 2 back through the first activation stage of the adsorber. This recirculation process is continuous.

The captive stream of gas in the first activation cycle is circulated, by means of the blower 3, through the heater 2, the first activation stage of the adsorber and the condenser-separator 4. The composition of this stream will build up gradually in terms of condensable vapors, composed chiefly of hydrocarbons, until the dew point of the captive gas stream reaches condenser temperature and will, thereafter, yield as liquid all the condensable vapors desorbed in the first activation stage of the adsorber.

The captive activation gas for the second activation stage is heated in the heater 2' to a temperature of about 500° F., and from the heater, passes through a pipe line 12 to the second activation stage of the adsorber. The heated gas passes upwardly through the second activation stage desorbing the accumulated moisture and hydrocarbons from the adsorbent material therein. The heated gas and the moisture vapor and condensable hydrocarbons desorbed from the adsorbent material pass through a pipe line 13 to the blower 3' and are recirculated by the blower through a pipe line 14 and the heater 2' back through the second activation stage of the adsorber. This recirculation process is continuous.

The vessels which contain the adsorbent beds are rotated so that each vessel passes in succession through the various stages of the adsorber. As the vessels move through each stage they are filled with the particular gas flowing through the stage and carry this gas into the next or succeeding stage in their rotary movement. This carrying of gas from one stage to the other by the vessels is called slippage.

In order to prevent slippage gas from the first adsorption stage, which would consist of the raw gas being treated, from being carried over into the first activation stage and diluting the recycling activation gas, a purging stage is interposed between the first adsorption stage and the first activation stage and called the first purging stage.

In order to prevent slippage gas from the first activation stage, which is very rich in condensable hydrocarbons, from being carried over into the second activation stage, a purging stage is interposed between the first activation stage and the second activation stage, called the second purging stage.

Also, in order to prevent the slippage gas from the second activation stage, which contains some condensable hydrocarbons, from being carried over into the second adsorption stage, where it would pass out of the adsorber with the outgoing stripped natural gas, a purging stage is interposed between the second activation stage and the second adsorption stage, called the third purging stage.

A portion of the captive activation gas employed in the first activation cycle flowing to the heater 2 through pipe line 11 is continuously diverted through pipe line 15 for use as the purging gas in the first purging stage. The effluent gas from the first purging stage passes through pipe line 15' back into pipe line 5 to join the flow of the raw gas being treated on its way to the first adsorption stage of the adsorber. This permits the purging gas in the first purging stage to push the slippage gas in the first purging stage, which consists of raw gas, back into the incoming raw gas being treated on its way to the adsorber. And, as the gas used as the purging gas in the first purging stage consists of diverted activation gas from the first activation stage, the slippage gas from the first purging stage into the first activation stage would consist of activation gas, so that the recycling activation gas would not be diluted.

A portion of the captive activation gas employed in the second activation cycle flowing to the heater 2' through pipe line 14 is continuously diverted through pipe line 16 for use as the purging gas in the second purging stage. The effluent gas from the second purging stage passes through pipe line 17 into pipe line 10 and joins the recycling activation gas used in the first activation cycle. This permits the purging gas in the second purging stage to push the slippage gas in the second purging stage, which consists of activation gas from the first activation stage, back into the recycling stream of the activation gas used in the first stage. And, as the gas used as the purging gas in the second purging stage consists of diverted activation gas from the second activation stage, the slippage gas from the second purging stage into the second activation stage would consist of activation gas so that the recycling activation gas in the second activation stage would not be diluted.

A portion of the effluent stripped gas flowing from the second adsorption stage of the adsorber through pipe line 7, is continuously diverted through pipe line 18 for use as the purging gas in the third purging stage. The effluent gas from the third purging stage passes through pipe line 19 into pipe line 13 and joins the recycling activation gas used in the second activation cycle. This permits the purging gas in the third purging stage to push the slippage gas in the third purging stage, which consists of activation gas from the second activation stage and contains hydrocarbons, back into the recycling stream of the activation gas used in the second activation stage. And, as the gas used as the purging gas in the third purging stage consists of diverted effluent stripped natural gas from the second adsorption stage, the slippage gas from the third purging stage into the second adsorption stage would consist of stripped natural gas so that no condensable hydrocarbons would be lost.

The employment of the two activation cycles and the three purging cycles, as above outlined, effects a very complete removal of the desired hydrocarbons and increases the efficiency and operation of the adsorber.

While any suitable type of rotary adsorber may be employed to practice the method of the present invention, the adsorber illustrated is generally similar to the fluid treating apparatus shown in my Patent No. 2,751,033 issued June 19, 1956, for Fluid Treating Apparatus.

As shown in Figs. 2 to 11, inclusive, the adsorber comprises an elongated upright cylindrical pressure vessel 20 having flanged vertically aligned circular openings 21, 22 in its top and bottom walls, respectively, closed by top and bottom flanged cover plates 23, 24 removably secured to cover said openings, as by bolting; suitable framework, indicated at 25, for supporting the vessel 20 in an upright position, a rotatable vertical shaft 26 extending through the pressure vessel 20 with its upper end journaled in a suitable cap bearing carried by the upper closure member 23 and with its lower end extending through a suitable shaft seal, secured to the bottom of the lower closure member 24; a vertical shaft 27 coupled to the bottom end of the shaft 26 and connected to suitable differential gearing, indicated at 28, driven by a motor 29; a support disc 30 fixedly mounted on the shaft 26 for rotation therewith within said pressure vessel and providing support for a plurality of elongated fluid treating material containing cylindrical vessels 31; upper and lower distributive assemblages, indicated generally at 32, 33, each assemblage comprising an annular stationary member 34 having a plurality of compartments or manifolds formed therein, a tube sheet disc valve 35 slidably mounted on the shaft 26 for rotation therewith, a spring support disc 36 fixedly mounted on the shaft 26 and supporting a plurality of coiled springs 37 which engage the tube sheet disc valve 35 and tightly press it against the open end of the annular stationary member 34; a plurality of flexible pipes 38, each connecting the upper end portion of one of the vessels 31 and the tube sheet disc valve 35 of the upper distributive assemblage; a plurality of flexible pipes 39, each connecting the lower end portion of one of the vessels 31 and the tube sheet disc valve 35 of the lower distributive assemblage, a plurality of inlet-outlet conduits, seven such being shown, 40, 41, 42, 43, 44, 45 and 46, connected to the annular stationary member 34 of the upper distributive assemblage and extending upwardly through the upper cap closure member 23, for the ingress and egress of fluids to and from the upper stationary member 34; and a plurality of inlet-outlet conduits, seven such being shown, 40', 41', 42', 43', 44', 45' and 46', connected to the annular stationary member 34 of the lower distributive assemblage and extending downwardly through the lower cap closure member 24 for the ingress and egress of fluids to and from the lower stationary member 34.

The cylindrical pressure vessel 20 and the cap cover members 23, 24 are preferably made of heavy boiler plate. The flanges formed on the peripheries of the openings 21, 22 of the vessel 20 and the peripheries of the cap cover members 23, 24 are preferably formed of heavy iron rings, rectangular in cross section and are welded to the peripheral edges of the openings and the cover plates, as indicated at 47.

The shafting 26, preferably and as shown, is formed of three sections, an upper section 48, an intermediate section 49, and a lower or bottom section 50. The upper and lower sections 48 and 50 consist of solid rod, round in cross section. The intermediate section 49 consists of a hollow pipe having an internal diameter considerably larger than the diameters of the upper and lower sections.

The upper section 48 has its upper end journaled in a suitable cap bearing 51 carried by the upper cover member 23 and its lower end supported in a support bushing 52 mounted in the upper end of the intermediate section 49 with a pin 53 passing through the two sections and the bushing for rigidly and detachably securing the two sections together.

The bottom section 50 has its upper end engaged in a support bushing 54 mounted in the lower end of the intermediate section 49 with a pin 55 passing through the two sections and the bushing for rigidly and detachably securing the two sections together, and with its lower end extending through the lower cover member 24 and a suitable shaft seal 56 and coupled to the upper end of the shaft 27.

The support disc 30 which supports the cylindrical vessels 31 is composed of two semi-annular flat pieces 57, the inner adjacent straight edges of which are provided with flanges which are bolted together to form the complete disc. This is to permit of assembling the disc within the pressure vessel 20.

The disc 30 (see Figs. 4 and 7) is fixedly secured, as by bolting, to a collar 58 fixedly secured to the intermediate section 49 of the shaft 26, so that the disc will rotate with the shaft. The outer peripheral edge portion of the disc 30 is supported by means of a plurality of supporting links or arms 59, each having its upper end bolted to one of a plurality of circumferentially spaced lugs 60 carried by a collar 61 fixedly secured to the intermediate section 49 of the shaft 26 and its lower end bolted to one of a plurality of circumferentially spaced upstanding lugs 62 secured to the upper surface of the disc 30.

Figure 4:
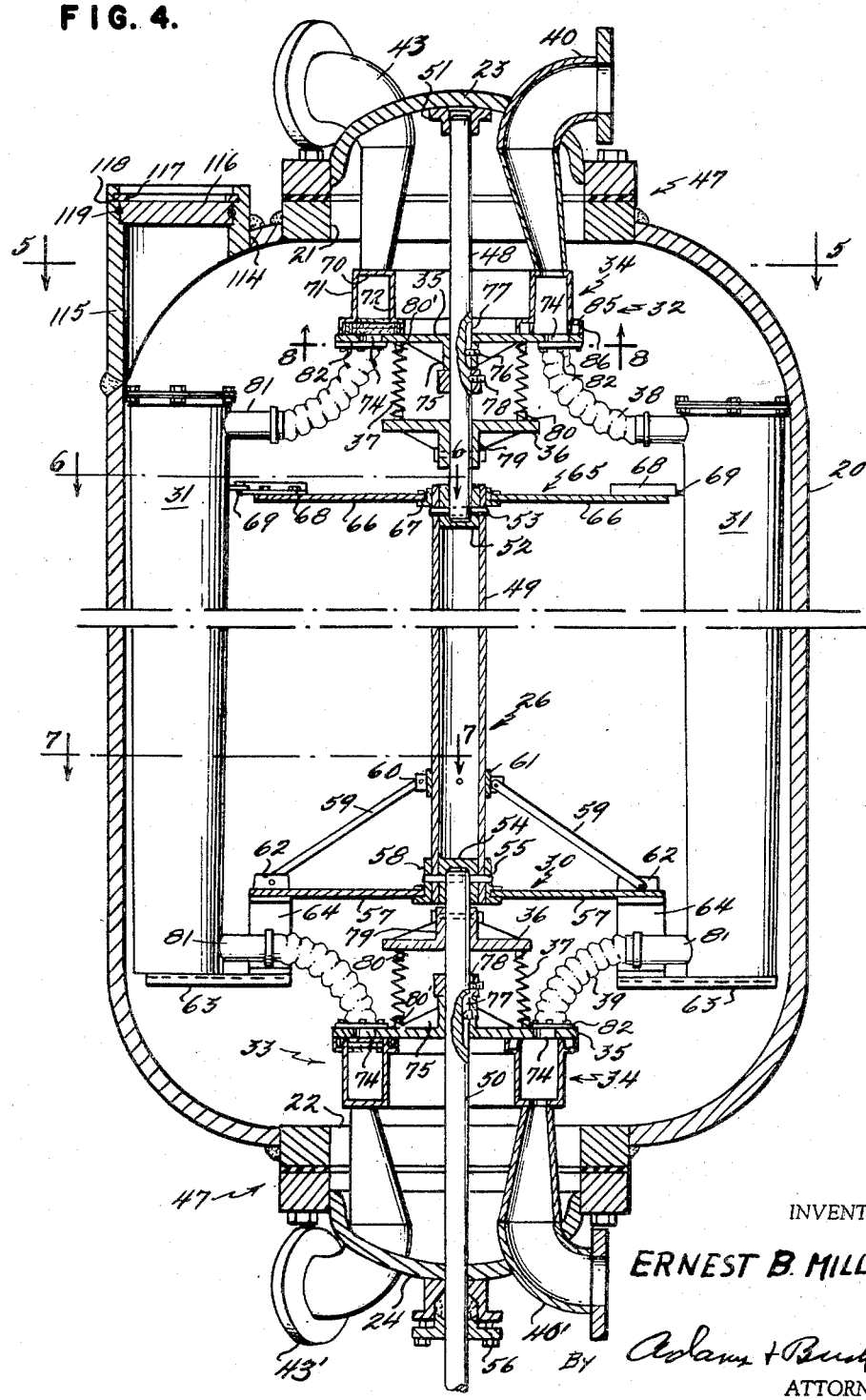
Fig. 4 is a vertical sectional view taken on the line 4—4 of Fig. 3, but omitting the driving apparatus.
Figure 5:
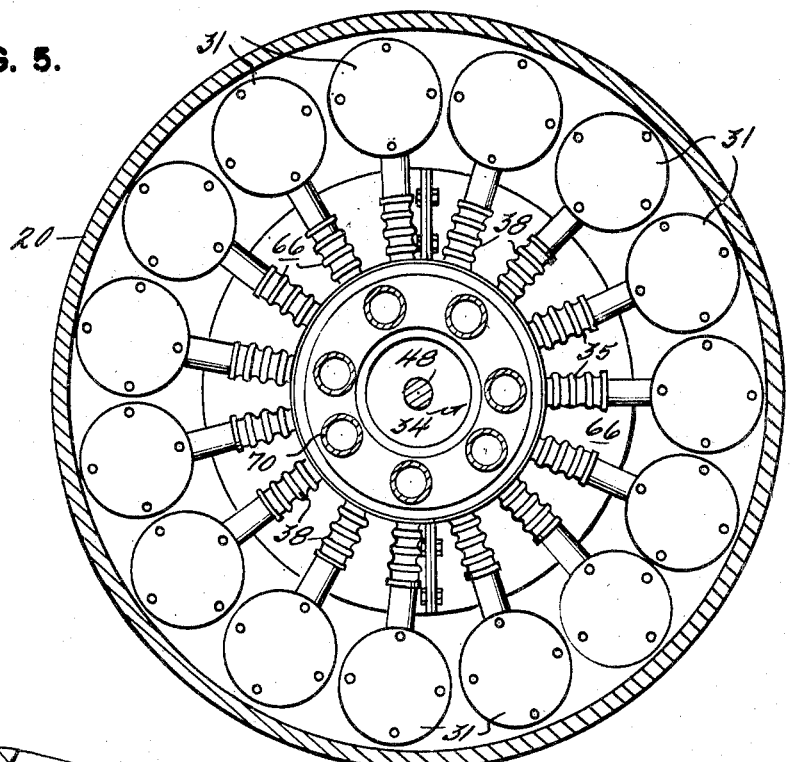
Fig. 5 is a horizontal sectional view taken on the line 5—5 of Fig. 4.
Figure 6:
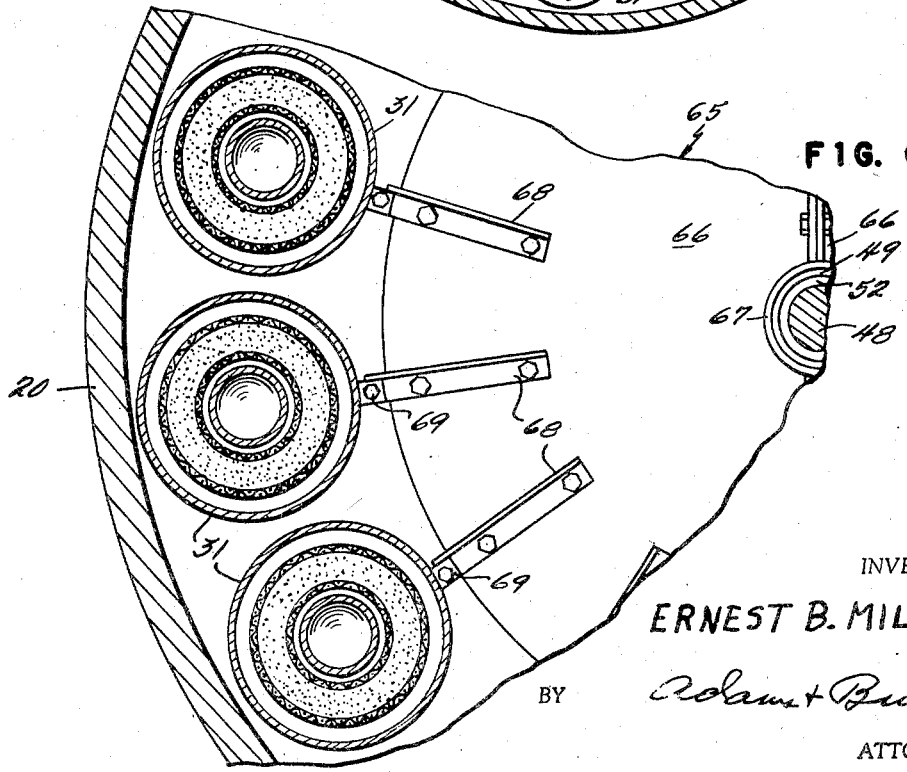
Fig. 6 is a fragmentary sectional view taken on the line 6—6 of Fig. 4, showing the manner of bracing the upper ends of the elongated adsorbent material containing vessels.

The vessels 31 are supported by the disc 30, as by means of a plurality of supporting links or arms 63 in the form of short sections of structural angles, each arm 63 having its outer end portion fixedly secured to the bottom and one side of one of said vessels 31, as by welding, and its inner end portion fixedly secured, as by bolting, to one of a plurality of circumferentially spaced dependent lugs 64, in the form of short sections of I-beams, welded to the under surface of the disc 30 (see Figs. 4 and 7).

Means may be provided for holding the cylindrical vessels 31 in their upright position encircling the shaft 26. In the particular embodiment of the invention illustrated, such means are shown as comprising a disc 65 composed of two semi-annular flat pieces 66, 66, the inner adjacent straight edges of which are provided with flanges which are bolted together to form the complete disc. This is to permit of assembling the disc within the pressure vessel 20. The disc 65 (see Figs. 4 and 6) is fixedly secured, as by bolting, to a collar 67 fixedly secured to the intermediate section 49 of the shaft 26, so that the disc will rotate with the shaft. The upper end portions of the vessels 31 are held in their upright position by the disc 65, as by means of a plurality of bracing strips or arms 68 in the form of short sections of structural angles. Each arm 68 has its outer end bolted to a lug 69 welded on the outer surface of one of the vessels 31 and its inner end portion fixedly secured, as by bolting, to the upper surface of the disc 65.

The upper and lower distributive assemblages 32, 33 are identical in construction and, as shown in Fig. 4, each comprises an annular trough-shaped stationary member 34 having a plurality of compartments or manifolds formed therein; a tube sheet disc valve 35 slidably mounted on the shaft 26 for rotation therewith; and a spring support disc 36 fixedly mounted on the shaft 26 and supporting a plurality of coiled springs 37 which engage the tube sheet disc valve 35 and tightly press it against the open end of the annular stationary member 34.

The upper and lower annular stationary members 34 are identical in construction and, as shown in Figs. 4, 5, 8 and 9, each is formed in the shape of an annular trough having an annular top (or bottom) wall 70 and annular side walls 71, 72 (see Figs. 4 and 9).

The member 34 is divided into a plurality of compartments or manifolds, as by means of a plurality of circumferentially spaced pairs of wall members 73 extending transversely of the member 34 and having their top (or bottom) and side walls welded to the top (bottom) and side walls of the member 34 to form gas-tight joints. Seven such compartments or manifolds are shown and, for the purposes of clarity of description, designated manifolds "a," "b," "c," "d," "e," "f" and "g," respectively. See Fig. 8.

The upper member 34 of the upper distributive assemblage 32 is held stationary relative to the rotation of the shaft 26 and the upper tube sheet disc valve 35 by the upper inlet-outlet conduits 40, 41, 42, 43, 44, 45, and 46, which are welded to the upper cap closure member 23 and have their lower ends connected, as by welding, to the manifolds "a," "b," "c," "d," "e," "f" and "g," respectively, in the upper member 34 to provide communication therewith.

The lower member 34 of the lower distributive assemblage is held stationary relative to the rotation of the shaft 26 and the lower tube sheet disc valve 35 by the lower inlet-outlet conduits 40', 41', 42', 43', 44', 45', and 46', which are welded to the lower cap closure 24 and have their upper ends connected, as by welding, to the manifolds "a," "b," "c," "d," "e," "f" and "g," respectively, in the lower member 34 to provide communication therewith.

The upper and lower tube sheet disc valves 35 are identical in construction and, as shown in Fig. 4, each comprises a flat metal disc having a plurality of circumferentially spaced circular openings 74 formed in a circular row adjacent its periphery. The disc is provided with a collar 75 having a plurality of radially extending reinforcing ribs welded to its bottom surface or cast integral therewith. The collar 75 is keyed on the upper (lower) section of the shaft 26 to have longitudinal movement therealong as well as rotative movement therewith, as by means of a set screw 76 slidably engaging in a longitudinal groove 77 formed in the upper (lower) section of the shaft 26. A second collar 78 is fixedly secured to the shaft 26 immediately beneath the collar 75 to limit the inward movement of the disc as it moves longitudinally of the shaft 26. The disc 35, as well as the collar 75, are loosely fitted on the shaft 26 so that the disc valve can be moved slightly to conform to any change in the plane of the engaged surface of the stationary member 34, due to unequal expansion and contraction.

The tube sheet disc 35 is so mounted on the shaft 26 that it slidably engages the open bottom (top) end of the annular stationary member 34 with the circular row of openings 74 vertically aligned with the manifolds "a," "b," "c," "d," "e," "f" and "g," so that each manifold will be in communication with a group of the circular openings.

The upper and lower spring support discs 36 are identical in construction and, as shown in Fig. 4, each comprises a metal disc mounted on the shaft and having a hub 79 provided with a plurality of circumferentially spaced radial ribs or webs welded to the under face of the disc to strengthen it. The hub is fixedly secured to the shaft, as by a set screw. A plurality of vertically extending circumferentially spaced coiled springs 37 are interposed between the tube sheet disc valve 35 and the spring support disc 36. In order to insure that the springs 37 remain in proper position, they are mounted on and between short stubs 80 extending upwardly from the disc 36 and short corresponding stubs 80' extending downwardly from the disc 35. The construction and arrangement is such that the springs 37 will keep the disc valve 35 evenly and firmly pressed into engagement with the under surface of the annular stationary member 34.

Figures 10, 11:
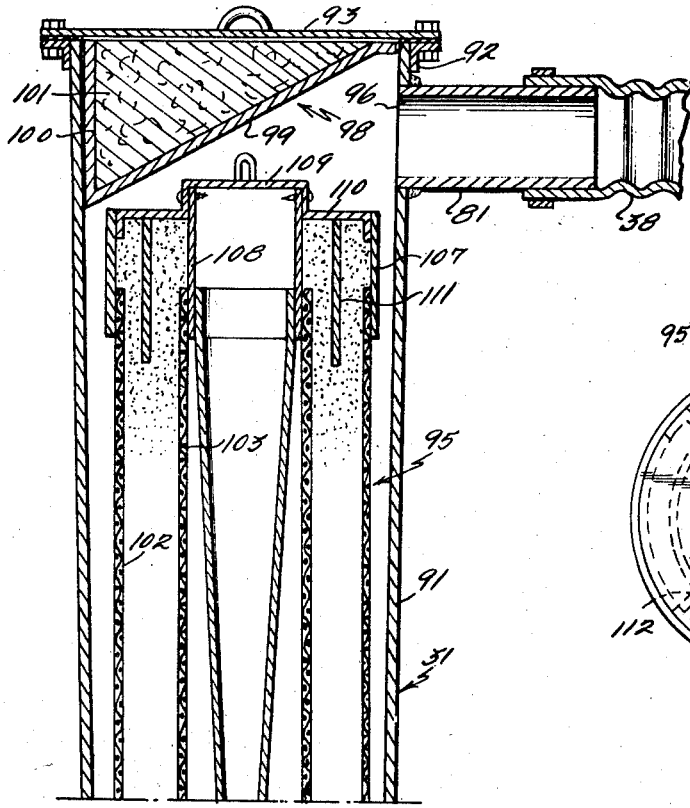
Fig. 10 is a vertical sectional view, with parts broken away, of the adsorbent material containing vessels shown in Fig. 4, showing the containers for holding the adsorbent material mounted therein.
Fig. 11 is a plan view of the container shown in Fig. 10.

The upper and lower flexible pipes 38, 39, which connect the upper and lower end portions of the adsorbent material containing vessels 31 to the upper and lower distributive assemblages are identical in construction and, as shown in Figs. 4 and 10, each comprises a thin walled cylindrical metal tube having the greater portion of its wall formed in a sinuous shape to give it flexibility, the outer cylindrical end of each tube is detachably secured to a nozzle 81 formed on the upper (lower) end portion of the vessel 31, as by strapping. The cylindrical inner end of the tube is provided with an integral flange 82. The opening in the cylindrical inner end of the tube is aligned with one of the circular openings 74 formed in the upper (lower) tube sheet disc valve 35 and the flange 82 is detachably secured to the outer surface of the disc valve, as by countersunk bolts, so that the inner surface of the disc wall will be smooth and uninterrupted (see Fig. 4.)

To prevent the escape of gas between the rotating tube sheet disc valve 35 and the manifolds in the member 34, sealing ring gaskets 83 are placed at the juncture of the side walls of the member 34 and the disc valve 35. The ring gaskets 83 are wedged into annular troughs 84, secured, as by welding, to the outer surface of the side walls of the member 34. Each trough comprises an annular top (bottom) wall 85 and an annular side wall 86. The ring gaskets 83, preferably and as shown, comprise a plurality of annular strips of packing, generally rectangular in cross section and made of any suitable material, such as "Teflon" or impreganated asbestos.

The seven manifolds "a," "b," "c," "d," "e," "f," and "g" are sealed off from each other by means of cross seals 87, each sealed into a recess 88 formed by the adjacent end walls of the manifolds and a bottom plate 89 vertically spaced from the open end of the manifolds (see Figs. 8 and 9). Each cross seal is tightly wedged in its recess with its outer ends in tight engagement with the adjacent side walls of the annular seals 83 and with its bottom surface in sealing engagement with the upper (lower) surface of the tube sheet disc. In order for the outer ends of the cross seals to engage the adjacent side walls of the annular seals 83, the portions of the side walls 71 and 72 of the member 34 which extend between each pair of adjacent transverse members 73 are cut away, as indicated at 90, for a distance equal to the thickness of the seals 83 (see Fig. 9).

The widths of the manifolds "a," "b," "c," "d," "e," "f" and "g" are substantially the same as the internal diameters of the circular openings 74 in the tube sheet disc 35, so that each cross seal can effectively seal off one of the openings.

Each of the openings 74 formed in the upper tube sheet disc 35, is in vertical alignment with a corresponding one of the openings 74 formed in the lower tube sheet disc 35 and each of the cross seals 87 which separate the manifolds "a," "b," "c," "d," "e," "f" and "g" formed in the upper stationary member 34 is in vertical alignment with a corresponding one of the cross seals 87 which separate the manifolds "a," "b," "c," "d," "e," "f" and "g" formed in the lower stationary member 34.

When the rotary disc valves 35 and the vessels 31 are stationary, the foregoing arrangement, in effect, divides the adsorbent material containing vessels 31 into seven groups, with one group connected to communicate with the manifolds "a," one group connected to communicate with the manifolds "b," one group connected to communicate with the manifolds "c," one group connected to communicate with the manifolds "d," one group connected to communicate with the manifolds "e," one group connected to communicate with the manifolds "f," and one group connected to communicate with the manifolds "g." Each group of vessels 31, together with the upper and lower manifolds with which they are in communication form separate flow passages through the adsorber so that seven separate, distinct and continuous flows of fluid may pass through the apparatus. Each flow entering the upper distributive assemblage by means of one of the inlet-outlet conduits 40, 41, 42, 43, 44, 45 or 46, thence through one of the groups of vessels 31 into the lower distributive assemblage and out through one of the inlet-outlet conduits 40', 41', 42', 43', 44', 45', or 46'. As the vessels 31 and the upper and lower disc valves 35 rotate, each of the flows of fluid will successively pass through the vessels 31. For convenience in description, each flow passage is called a stage, in which either adsorption, activation, or purging takes place, depending upon the particular fluid flowing therethrough. Also, the vessels 31 are called zones, in which either adsorption, activation or purging takes place, depending upon the particular fluid flowing therethrough at a given time.

The silica gel containing vessels 31 are identical in construction and, as shown in Figs. 10 and 11, each comprises an elongated hollow tubular member 91 having a closed bottom end and an open upper end provided with a flanged collar 92 to which is secured, as by bolting, a removable cover plate 93.

A horizontally disposed annular disc 94 is mounted in the lower end portion of the member 91 and secured therein, as by welding, to form a gas-tight joint between the outer peripheral edge of the disc and the side wall of the member 91. The lower annular disc 94 forms a support for an elongated annular fluid treating material container 95. The container 95 is removably mounted within the member 91, with its bottom end resting on the annular disc 94 and with the longitudinal open end of the container aligned with the opening in the disc.

The tubular member 91 has a tapered side wall for a purpose hereinafter to be described and is provided with upper and lower circular openings 96 in which are secured, as by welding, the nozzles 81 to which the upper and lower flexible pipes 38 and 39 are secured.

A baffle member 97 is mounted in the space between the bottom of the member 91 and the annular disc 94, and an upper baffle member 98 is secured to the underside of the cover plate 93 and is removable therewith. The upper and lower baffle members 98 and 97 are identical in construction and, as shown in Fig. 10, each comprises a generally elliptical-shaped flat sheet 99 extending upwardly (downwardly) from the bottom (top) of the member 91 to insure an even flow of fluid through the member 91; a side wall forming member 100; and insulating material 101 placed within the pocket formed by the members 99 and 100 and the bottom (top) wall of the member 91 (see Fig. 10).

The containers 95 are identical in construction and, as shown in Figs. 10 and 11, each comprises two concentric tubular screens 102, 103, held in spaced-apart relation by a plurality of longitudinal radial fins 104, with the annular space between the screens closed at the bottom, as by a flanged annular plate 105. The mesh of the screens is such as to retain a granular adsorbent material 106 in the annular space between the screens. In the instant case, the adsorbent material may be of any adsorbent having characteristics substantially like silica gel or the gel of other activated hydrous oxides. Preferably silica gel is used.

Each of the containers 95 is closed at its top by means of concentric hoops or metal bands 107, 108 mounted on the concentric screens 102, 103, and a cover plate 109 is detachably connected to the inner hoop or band 108, as by screws, and having a depending annular flange 110 fitting between the hoops or bands 107, 108. A depending cylindrical fin 111 is secured to the flange 110 and projects downwardly between and below the hoops or bands 107, 108, and fits in slits 112 formed in the upper ends of the radial fins 104, all as shown in Figs. 10 and 11. The construction is such that, as the silica gel settles down, leaving a space between the top portions of the wire screens devoid of silica gel, the fin 111 will prevent fluid from passing through the space.

Mounted within the inner wire screen 103 is an inverted substantially conically shaped baffle member 113. The baffle member 113 is closed at its apex which extends downwardly to a point near the bottom of the container and has its upper peripheral edge suitably secured to the band 108, as by welding. Preferably, the baffle member 113 is made of thin sheet metal.

When the container 95 is mounted within the hollow member 91, as shown in Fig. 10, the elongated annular space between the walls of the member 91 and the inverted conical baffle member 113 forms an elongated frusto-conically shaped duct which is annular in cross section. The annular container, filled with silica gel, is positioned in the duct between the members 91 and 113 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the members 91 and 113, as baffle members, the entire area is made use of with resultant increase in efficiency, capacity and economy.

Means may be provided so that the containers 95 which hold the adsorbent material may readily be removed from and replaced in the vessels 31. As shown, such means may comprise an opening 114 formed in the top of the vessel 20 having a cylindrical member 115 welded therein and provided with a readily removable closure disc 116 secured in the upper end of the member 115, as by means of a split shear ring 117 bolted thereto and fitted into a circumferential recess 118 formed in the inner surface of the member 115, and an O-ring packing 119 mounted between the closure disc 116 and the side wall of the member 115 to insure gas tightness.

The flows of the various gases through the various stages of the adsorber and the auxiliary apparatus are schematically shown in Fig. 1.

As there shown, the natural gas is supplied under high pressure from about 800 p. s. i. to about 1000 p. s. i. by pipe line 5 and enters manifold "a" of the upper distributive assemblage through inlet-outlet conduit 40. From manifold "a" the gas passes through openings 74 formed in the upper tube sheet disc valve 35 and flexible pipes 38 into the upper end portion of the group of vessels 31 which are at that time in communication with the manifold "a." The gas passes down through the silica gel beds therein into the bottoms of the vessels. The baffle members 113, in cooperation with the tapered side walls of the vessels 31, insure a substantially uniform flow and distribution of the gas through the silica gel beds, which adsorb some of the water vapor and condensable hydrocarbons from the gas. From the bottoms of the vessels 31, the now partially dried gas passes through outlet pipes 39 and openings 74 in the lower tube sheet disc valve 35 into the manifold "a" of the lower distributive assemblage.

From the lower manifold "a" of the lower distributive assemblage, the gas passes through inlet-outlet conduit 40' and pipe line 6 to the second adsorption stage and enters manifold "b" of the lower distributive assemblage through inlet-outlet conduit 41'. From the lower manifold "b" the gas passes through openings 74 in the tube sheet disc valve 35 and inlet pipes 39 into the lower end portion of the group of vessels 31 which are at that time in communication with manifold "b." The gas passes upwardly through the vessels 31 of the second group and through the silica gel beds therein into the tops thereof, additional water vapor and condensable hydrocarbons being adsorbed from the gas during its passage through the silica gel beds.

From the tops of the vessels 31 of the second adsorption group, the gas passes through pipes 38 and openings 74 in the upper tube sheet disc valve of the upper distributive assemblage into the upper manifold "b."

From the upper manifold "b" the gas passes through inlet-outlet pipe 41 and pipe line 7 to the various points of use.

The removal and recovery of the moisture and hydrocarbons from the beds of adsorbent material is effected in the first activation stage. The activation gas, a captive gas, is heated in a heater 2, where its temperature is raised to about 400° F., depending upon the moisture content and the type of hydrocarbons to be recovered. From the heater, the heated activation gas passes through pipe line 8 and inlet-outlet conduit 45' into the lower manifold "f" of the lower distributive assemblage. From the manifold "f" the hot activation gas passes through openings 74 in the lower tube sheet disc valve 35 and flexible pipes 39 into the lower end portions of the groups of vessels 31 which are at that time in communication with manifold "f." The gas passes upwardly through vessels 31 of the first activation group and through the silica gel beds therein into the tops thereof. As the hot gas passes through the adsorbent material it removes the adsorbed moisture vapor and hydrocarbons therefrom. From the tops of the vessels 31, the hot moisture, hydrocarbon laden gas passes through flexible pipes 38 and openings 74 in the upper tube sheet disc valve 35 into the upper manifold "f." From the upper manifold "f," the hot gas passes through inlet-outlet conduit 45 and pipe line 9 to the condenser separator 4 where the moisture and condensable hydrocarbons are condensed and separated. The water and hydrocarbons are drained from the separator by a suitable drain line. From the condenser separator 4, the stripped captive gas passes through pipe line 10 to the blower 3 and is recycled by the blower through pipe line 11, the heater 2 and pipe line 8 back through the first activation stage. This recirculation process is continuous.

The captive stream of gas in the first activation cycle is circulated by means of the blower 3, through the heater 2, the activation stage of the adsorber, and the condenser separator 4. The composition of this stream will build up gradually in terms of condensable vapors, composed chiefly of hydrocarbons, until the dew point of the captive gas stream reaches condenser temperature, and will thereafter yield as liquid all the condensable vapors desorbed in the activation stage of the adsorber.

In order to effect the complete removal of the desired hydrocarbons, a second activation cycle following the first activation cycle is provided. The activation gas, a captive gas, is heated in the heater 2', where its temperature is raised to about 500° F. From the heater, the heated activation gas passes through pipe line 12 and inlet-outlet conduit 43' into the lower manifold "d" of the lower distributive assemblage. From the manifold "d" the hot activation gas passes through openings 74 in the lower tube sheet disc valve 35 and flexible pipes 39 into the lower end portions of the group of vessels 31 which are at that time in communication with manifold "d." The gas passes upwardly through vessels 31 of the second activation group and through the silica gel beds therein into the tops thereof. As the hot gas passes through the adsorbent material it removes all remaining hydrocarbons therefrom. From the tops of the vessels 31, the hot hydrocarbon laden gas passes through flexible pipes 38 and openings 74 in the upper tube sheet disc valve 35 into the upper manifold "d." From the upper manifold "d," the hot gas passes through inlet-outlet conduit 43 and pipe line 13 to the blower 3', and is recycled by the blower through pipe line 14, heater 2', and pipe line 12, back through the second activation stage. This recycling process is continuous.

In order to prevent dilution of the recycling activation gases and to prevent any loss of hydrocarbons into the effluent stripped gas from the last adsorption stage, three purging stages are employed, a first purging stage immediately preceding the first activation stage, a second purging stage interposed between the first and second activation stages, and a third purging stage immediately following the third activation stage.

A portion of the recycling activation gas, used in the first activation stage, flowing through pipe line 11, is continuously diverted for use as the purging medium in the first purging stage and passes through pipe line 15 and inlet-outlet conduit 46' into the lower manifold "g" of the lower distributive assemblage. From the manifold "g" the purging gas passes through openings 74 in the lower tube sheet disc valve 35 and flexible pipes 39 into the lower portions of the group of vessels 31 which are at that time in communication with manifold "g." The gas passes upwardly through the vessels 31 of the first purging stage and through the silica gel beds therein into the tops thereof. As the purging gas passes through the adsorbent material it removes the slippage natural gas, thereby purging the beds. From the tops of the vessels 31 the effluent gas, consisting substantially of slippage gas from the first adsorption stage, passes through flexible pipes 38 and openings 74 in the upper tube sheet disc valve 35 into the upper manifold "g." From the upper manifold "g" the gas passes through inlet-outlet conduit 46 and pipe line 15' into pipe line 5 and joins the natural gas being treated on its way to the adsorber.

A portion of the recycling activation gas used in the second activation stage flowing through pipe line 14 is continuously diverted for use as the purging medium in the second purging stage and passes through pipe line 16 and inlet-outlet conduit 44 into the upper manifold "e" of the upper distributive assemblage. From the manifold "e" the purging gas passes through openings 74 in the upper tube sheet disc valve 35 and flexible pipes 38 into the upper end portions of the group of vessels 31 which are at that time in communication with manifold "e." The gas passes downwardly through the vessels 31 of the second purging stage and through the silica gel beds therein into the bottoms thereof. As the purging gas passes through the adsorbent material it removes the slippage activation gas from the first activation stage, thereby purging the beds. From the bottoms of the vessels 31, the effluent gas, consisting substantially of slippage activation gas, passes through flexible pipes 39 and openings 74 in the lower tube sheet disc valve 35 into the lower manifold "e." From the lower manifold "e" the gas passes through inlet-outlet conduit 44' and pipe line 17 to pipe line 10 and joins the recycling activation gas used in the first activation stage.

The gas used as the purging gas in the third purging stage is obtained by continuously diverting a portion of the flow of the stripped natural gas through pipe line 7 from the last adsorption stage of the adsorber, through pipe line 18 and inlet-outlet conduit 42 into the upper manifold "c" of the upper distributive assemblage. From the manifold "c" the purging gas passes through openings 74 in the upper tube sheet disc valve 35 and flexible pipes 38 into the upper end portions of the group of vessels 31 which are at that time in communication with manifold "c." The gas passes downwardly through the vessels 31 and through the silica gel beds therein into the bottoms thereof. As the purging gas passes through the adsorbent material it removes the slippage activation gas from the second activation stage, thereby purging the beds. From the bottoms of the vessels 31, the effluent gas, consisting substantially of slippage activation gas, passes through flexible pipe 39 and openings 74 into the lower tube sheet disc valve 35 into the lower manifold "c." From the lower manifold "c" the gas passes through inlet-outlet conduit 42' and pipe line 19 to pipe line 13 and joins the recycling activation gas used in the second activation stage.

The gas being treated makes two passes through the adsorber, while each of the activation gases and each of the purging gases each make a single pass through the adsorber. For convenience in description, the stage of the adsorber through which the first adsorption passage of the gas being treated is made, is called the first adsorption stage, the stage through which the second adsorption passage is made is called the second adsorption stage, the stage through which the first activation gas passes is called the first activation stage, the stage through which the second activation gas passes is called the second activation stage, the stage through which the first purging gas passes is called the first purging stage, the stage through which the second purging gas passes is called the second purging stage, and the stage through which the third purging gas passes is called the third purging stage. Also, the vessels 31 are called zones in which either adsorption, activation, or purging takes place, depending upon the particular fluid flowing therethrough at a given time. In addition, the condenser separator 5 is called a condensing and separating zone or stage.

Figure 2:
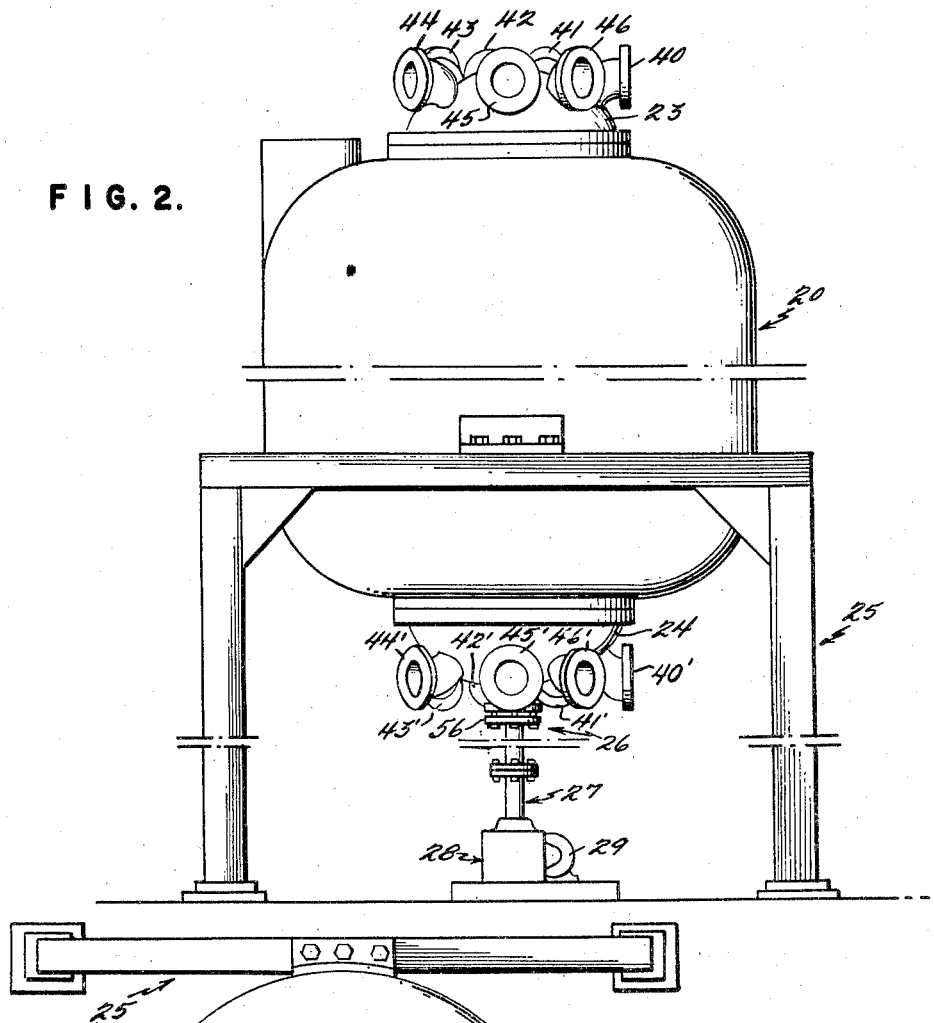
Fig. 2 is a side elevational view of the adsorber shown in Fig. 1.
Figure 3:
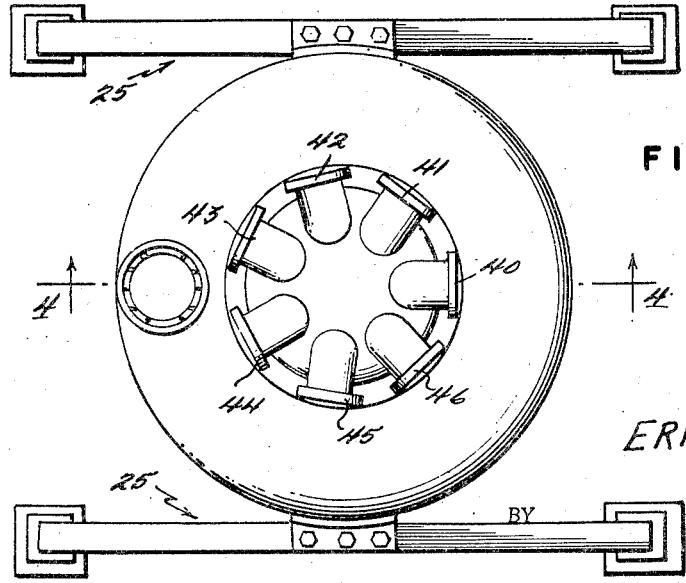
Fig. 3 is a plan view of the apparatus shown in Fig. 2.

In the particular embodiment of the invention illustrated, the valve discs 35 and the vessels 31 are rotated clockwise, as viewed in Fig. 2, and at a rate such that the effluent gas flow from the purging stages will be substantially volumetric with the slippage gas brought into these stages as the vessels 31 are rotated; thus it will be seen that, as the valves 35 and the vessel 31 rotate, each of the vessels 31 will be successively brought into communication with the manifolds "g," "f," "e," "d," "c," "b" and "a" in the upper and lower distributive assemblages, so that each vessel 31 will, in turn, become a first purging zone, a first activation zone, a second purging zone, a second activation zone, a third purging zone, a second adsorption zone, and a first adsorption zone.

Suitable stop valves are provided at any desired point in any pipe line to provide means for controlling the flow of the various mediums through the various stages of the adsorber and the auxiliary apparatus.

From the foregoing, it readily will be seen that there has been provided a novel and improved cyclic adsorption process for removing and recovering moisture and condensable hydrocarbons from wet natural gas in which two activation steps are employed to effect a more complete removal of the water vapor and desired hydrocarbons and a plurality of purging steps are employed so as to permit a build up of desorbed products in the recycling captive activation gas streams by preventing the dilution of the activation gases by slippage gas and also to prevent loss of desorbed products by slippage of activation gas into the outgoing effluent stripped natural gas.

While some of the flows of fluid through the apparatus have been described as entering the top distributive assemblage and flowing downward to and out of the bottom distributive assemblage, obviously, the flows may be in either direction.

Obviously, too, the present invention is not restricted to the particular embodiments thereof herein shown and described.

What is claimed is:

1. In the process of treating wet natural gas to remove and/or recover water vapor and condensable hydrocarbons therefrom involving the contact of adsorbent material with the gas to be treated with resultant adsorption of the water vapor and condensable hydrocarbons by the adsorbent material and the subsequent treatment of the adsorbent material with a heated medium to vaporize and remove the water and condensable hydrocarbons and thereby reactivate the adsorbent material for further contact with the gas to be treated, the improvement which comprises rotating a series of separated beds of adsorbent material directly in succession and substantially continuously relative to and through a first purging stage, a first activation stage, a second purging stage, a second activation stage, a third purging stage and at least one adsorption stage; continuously directing a flow of the gas being treated, under high pressure and in succession, through the adsorption stages so that the water vapor and condensable hydrocarbon content thereof which is to be removed will be adsorbed by the adsorbent material therein; continuously heating and recycling a flow of activation medium through said first activation stage to desorb the water and condensable hydrocarbons contained in the beds of adsorbent material therein and reactivate the adsorbent material; continuously heating and recycling a flow of activation medium through said second activation stage to desorb the water and condensable hydrocarbons contained in the beds of adsorbent material therein and reactivate the adsorbent material; continuously diverting a portion of the flow of the recycling activation medium used in the first activation stage and directing its flow through the first purging stage to remove all of the gas being treated therefrom; continuously directing the flow of the effluent gas from the first purging stage into the flow of the gas being treated on its way to the first adsorption stage of the adsorber; continuously diverting a portion of the flow of the recycling activation medium used in the second activation stage and directing its flow through the second purging stage to remove all of the activation medium therefrom; continuously directing the flow of the effluent gas from the second purging stage into the flow of the recycling activation medium used in the first activation stage; continuously diverting a portion of the flow of the effluent stripped gas being treated from the last of the adsorption stages and directing its flow through the third purging stage to remove all of the activation medium therefrom; continuously directing the flow of the effluent gas from the third purging stage into the flow of the recycling activation medium used in the second activation stage; and continuously directing the flow of the captive activation medium used in the first activation stage as it is recycled and after its passage through the first activation stage, through a condensing and separating stage and there condensing and removing the water and condensable hydrocarbons therefrom.

2. The process as set forth in claim 1, wherein the activation medium recycled through the first activation stage is heated to about 400° F. and the activation medium recycled through the second activation stage is heated to about 500° F.

3. In the process of treating wet natural gas to remove and/or recover water vapor and condensable hydrocarbons therefrom involving the contact of adsorbent material with the gas to be treated with resultant adsorption of the water vapor and condensable hydrocarbons by the adsorbent material and the subsequent treatment of the adsorbent material with a heated medium to vaporize and remove the water and condensable hydrocarbons and thereby reactivate the adsorbent material for further contact with the gas to be treated, the improvement which comprises maintaining at least one bed of adsorbent material in each of a plurality of zones; continuously heating and recycling a first flow of a captive activation medium through at least one of said zones to desorb the water and condensable hydrocarbons contained in the beds of adsorbent material therein and reactivate the adsorbent material; continuously heating and recycling a second flow of a captive activation medium through at least another one of said zones to desorb the water and condensable hydrocarbons contained in the beds of adsorbent material therein and reactivate the adsorbent material, continuously directing a first flow of a purging medium through at least another one of said zones to purge the zone; continuously directing a second flow of a purging medium through at least another one of said zones to purge the zone; continuously directing a third flow of a purging medium through at least another one of said zones to purge the zone; continuously directing the flow of the gas being treated through the remainder of said zones so that the water vapor and some of the condensable hydrocarbon content of the gas will be adsorbed by the adsorbent material therein; periodically shifting the relative positions of the particular adsorbent material and the particular flow of fluid in each of said zones so that each zone becomes in succession a first purging zone; a first activation zone, a second purging zone; a second activation zone, a third purging zone and an adsorption zone; continuously diverting a portion of said first flow of a captive recycling activation medium for use as the first purging medium and continuously directing the flow of the effluent gas from the first purging zone back into the flow of the gas being treated on its way to the first adsorption zone; continuously diverting a portion of said second flow of a captive recycling activation medium for use as the second purging medium and continuously directing the flow of the effluent gas from the second purging zone into said first flow of a captive recycling activation medium; continuously diverting a portion of the flow of stripped effluent gas from the last adsorption zone for use as the third purging medium and continuously directing the flow of the effluent gas from the third purging zone into said second flow of a captive recycling activation medium; and continuously directing said first flow of a captive recycling activation medium as it is recycled and after its passage through the first activation zone, through a condensing and separating zone and there condensing and removing the water and condensable hydrocarbons therefrom.

4. The process as set forth in claim 3, wherein the activation medium recycled through the first activation zone is heated to about 400° F. and the activation medium recycled through the second activation zone is heated to about 500° F.

References Cited in the file of this patent

UNITED STATES PATENTS

| | | |
|---|---|---|
| 1,721,033 | Okochi | July 16, 1929 |
| 1,998,774 | Bulkeley | Apr. 23, 1935 |
| 2,739,669 | Miller | Mar. 27, 1956 |
| 2,739,670 | Miller | Mar. 27, 1956 |
| 2,771,964 | Miller | Nov. 27, 1956 |